United States Patent
Miyano (10) Patent No.: US 9,633,253 B2
(45) Date of Patent: Apr. 25, 2017

(54) MOVING BODY APPEARANCE PREDICTION INFORMATION PROCESSING SYSTEM, AND METHOD

(71) Applicant: NEC Corporation, Tokyo (JP)

(72) Inventor: Hiroyoshi Miyano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/439,312

(22) PCT Filed: Aug. 30, 2013

(86) PCT No.: PCT/JP2013/073358
§ 371 (c)(1),
(2) Date: Apr. 29, 2015

(87) PCT Pub. No.: WO2014/069088
PCT Pub. Date: May 8, 2014

(65) Prior Publication Data
US 2015/0294140 A1 Oct. 15, 2015

(30) Foreign Application Priority Data

Oct. 29, 2012 (JP) .................. 2012-237987

(51) Int. Cl.
 *G06K 9/00* (2006.01)
 *G08B 13/196* (2006.01)
 *H04N 7/18* (2006.01)
(52) U.S. Cl.
 CPC ..... *G06K 9/00342* (2013.01); *G06K 9/00624* (2013.01); *G08B 13/19608* (2013.01); *G08B 13/19645* (2013.01); *H04N 7/18* (2013.01)
(58) Field of Classification Search
 CPC ........ G08B 13/19645; G08B 13/19608; G08B 13/19678; H04N 7/181; G06K 9/00335;
 (Continued)

(56) References Cited

U.S. PATENT DOCUMENTS 5,570,100 A * 10/1996 Grube .................. G01C 21/26
 342/457
6,809,760 B1 10/2004 Takagi et al.
(Continued)

FOREIGN PATENT DOCUMENTS

EP   2 453 412 A1   5/2012
JP   2006-81053     3/2006
(Continued)

OTHER PUBLICATIONS

Chen et al. "An adaptive learning method for target tracking across multiple cameras", Jun. 28, 2008, IEEE Conf. on Computer Vision and Pattern Recognition 2008, p. 1-8.*

(Continued)

*Primary Examiner* — Chan Park
*Assistant Examiner* — Timothy Choi
(74) *Attorney, Agent, or Firm* — Finnegan, Henderson, Farabow, Garrett & Dunner, L.L.P.

(57) ABSTRACT

An information processing system may include a memory storing instructions and one or more processors configured to execute the instructions to receive inputs of pictures imaged by a plurality of imaging apparatuses. The system may detect a moving body appearing in an inputted picture imaged by a first imaging apparatus among the plurality of imaging apparatuses. The system may predict a time period in which the moving body will appear in a picture imaged by a second imaging apparatus among the plurality of imaging apparatuses, based on a calculated probability that the moving body will appear in the picture imaged by the second imaging apparatus and an elapsed time after the moving body leaves an imaging range. The system may notify the predicted time period in which the moving body is predicted to appear in the picture imaged by the second imaging apparatus.

20 Claims, 7 Drawing Sheets

(58) Field of Classification Search
CPC ........... G06K 9/00342; G06K 9/00348; G06K 9/00624
See application file for complete search history.

(56) References Cited

U.S. PATENT DOCUMENTS

| | | | |
|---|---|---|---|
| 2003/0025800 A1* | 2/2003 | Hunter | G08B 13/19608 348/208.13 |
| 2008/0211916 A1 | 9/2008 | Ono | |
| 2010/0002082 A1* | 1/2010 | Buehler | G08B 13/19693 348/159 |
| 2010/0097475 A1* | 4/2010 | Yokomitsu | H04N 7/181 348/169 |
| 2010/0134627 A1* | 6/2010 | Yen | G06K 9/00771 348/159 |
| 2010/0157064 A1* | 6/2010 | Cheng | G06K 9/00771 348/169 |
| 2012/0019644 A1* | 1/2012 | Hamabashiri | G06T 7/2093 348/77 |
| 2015/0220798 A1* | 8/2015 | Miyano | G06K 9/00369 382/115 |
| 2015/0262019 A1* | 9/2015 | Miyano | G06K 9/00362 382/103 |

FOREIGN PATENT DOCUMENTS

| | | |
|---|---|---|
| JP | 2008-219570 | 9/2008 |
| JP | 2009-17416 | 1/2009 |
| JP | 2010-161732 | 7/2010 |

OTHER PUBLICATIONS

Costello et al., "Surveillance Camera Coordination Through Distributed Scheduling", Dec. 15, 2005, 44th IEEE Conf. on Decision and Control, p. 1485-1490.*

Collins et al. "A System for Video Surveillance and Monitoring", May 2000, Carnegie Mellon University Robotics Institute, Tech report CMU-RI-TR-00-12, p. 1-68.*

International Search Report mailed Oct. 15, 2013 in corresponding PCT International Application.

Extended European Search Report issued by the European Patent Office in counterpart European Patent Application No. 13850572.2, dated Jun. 8, 2016.

* cited by examiner

MOVING BODY APPEARANCE PREDICTION INFORMATION PROCESSING SYSTEM, AND METHOD

CROSS-REFERENCE TO RELATED PATENT APPLICATIONS

This application is a National Stage Entry of International Application No. PCT/JP2013/073358, filed Aug. 30, 2013, which claims priority from Japanese Patent Application No. 2012-237987, filed Oct. 29, 2012. The entire contents of the above-referenced applications are expressly incorporated herein by reference.

BACKGROUND

Modes pertaining to the present invention relate to an information processing system, an information processing method and a program.

In recent years, a system is being considered for performing wide-range monitoring by using pictures imaged by a plurality of video cameras (imaging apparatuses). Nevertheless, it is difficult to simultaneously monitor the pictures that were imaged using many video cameras. For example, when tracking a specific human figure with a monitoring system in which the respective imaging ranges of the plurality of video cameras do not overlap, when that human figure disappears outside the imaging range, the load of the monitor becomes extremely high since the observer needs to closely observe the pictures of the respective video cameras until the human figure appears in the imaging range of one of the video cameras. Thus, in order to deal with the foregoing problem, for instance, Patent Document 1 discloses a monitoring device capable of calculating the estimated arrival time that the intruder will arrive at the imaging range of the respective monitoring cameras, and subsequently displaying the estimated arrival time.

Patent Document 1: Patent Publication JP-A-2009-017416

SUMMARY

Nevertheless, even if the estimated arrival time is displayed according to the method described in Patent Document 1, since the displayed time is, after all, an estimated time, the time that the human figure actually appears may be sooner or later than the estimated time. Thus, this problem cannot be resolved simply by the user as the monitor viewing the picture of the video camera at the estimated time. Moreover, for instance, if the intruder to be tracked does not appear at the estimated arrival time, it is not possible for the user to determine whether the intruder is simply late in arriving, or whether it is likely that the intruder used a different path to go to a different location. Thus, with the method described in Patent Document 1, it was not possible to sufficiently lower the monitoring load of the user as the monitor.

Some modes of the present invention were devised in view of the foregoing problems, and one object of the present invention is to provide an information processing system, an information processing method and a program capable of suitably monitoring a moving body using a plurality of imaging apparatuses.

The information processing system according to the present invention includes: input means for receiving inputs of pictures imaged by a plurality of imaging apparatuses; detection means for detecting a moving body appearing in a picture input from the input means and imaged by a first imaging apparatus among the plurality of imaging apparatuses; prediction means for predicting a time period in which the moving body appears in a picture imaged by a second imaging apparatus among the plurality of imaging apparatuses, based on a time transition of a probability of the moving body, which is detected in the picture of the first imaging apparatus, appearing in the picture of the second imaging apparatus and a time passage after the moving body detected in the picture of the first imaging apparatus leaves an imaging range; and notification means for providing a notice regarding a time period in which the moving body is predicted to appear in the picture of the second imaging apparatus.

The information processing method according to the present invention is performed by an information processing system and includes: a step of receiving inputs of pictures imaged by a plurality of imaging apparatuses; a step of detecting a moving body appearing in a picture imaged by a first imaging apparatus among the plurality of imaging apparatuses; a step of predicting a time period in which the moving body appears in a picture imaged by a second imaging apparatus among the plurality of imaging apparatuses, based on a time transition of a probability of the moving body, which is detected in the picture of the first imaging apparatus, appearing in the picture of the second imaging apparatus and a time passage after the moving body detected in the picture of the first imaging apparatus leaves an imaging range; and a step of providing a notice regarding a time period in which the moving body is predicted to appear in the picture of the second imaging apparatus.

The program according to the present invention causes a computer to execute processing of receiving inputs of pictures imaged by a plurality of imaging apparatuses, processing of detecting a moving body appearing in a picture imaged by a first imaging apparatus among the plurality of imaging apparatuses, processing of predicting a time period in which the moving body will appear in a picture imaged by a second imaging apparatus among the plurality of imaging apparatuses based on a time transition of a probability of the moving body detected in the picture of the first imaging apparatus appearing in the picture of the second imaging apparatus and a time passage after the moving body detected in the picture of the first imaging apparatus leaves an imaging range, and processing of providing a notice regarding a time period in which the moving body is predicted to appear in the picture of the second imaging apparatus.

Note that, in the present invention, terms such as "unit", "means", "device" and "system" do not simply refer to a physical means, and include cases of realizing, with software, the functions of such "unit", "means", "device" and "system". Moreover, the functions of one "unit", "means", "device" or "system" may be realized with two or more physical means or devices, and the functions of two or more "units", "means", "devices" or "systems" may be realized with one physical means or device.

According to the present invention, it is possible to provide an information processing system, an information processing method and a program capable of suitably monitoring a moving body using a plurality of imaging apparatuses.

DETAILED DESCRIPTION

Embodiments of the present invention are now explained. The same or similar symbol is given to the same or similar configuration in the description of the drawings that will be explained and referenced below.

1 First Embodiment

FIG. 1 to FIG. 6 are diagrams explaining the first embodiment. This embodiment is now explained according to the following flow with reference to the foregoing diagrams. Foremost, the outline of the functional configuration of the system is described in "1.1", and the outline of the operation is explained in "1.2" while referring to specific examples of a display screen. Subsequently, the processing flow is described in "1.3", and a specific example of the hardware configuration capable of realizing this system is described in "1.4". Finally, effects and the like of this embodiment are described in "1.5" onward.

1.1 System Configuration (1.1.1 Outline of System Configuration)

Figure 1:
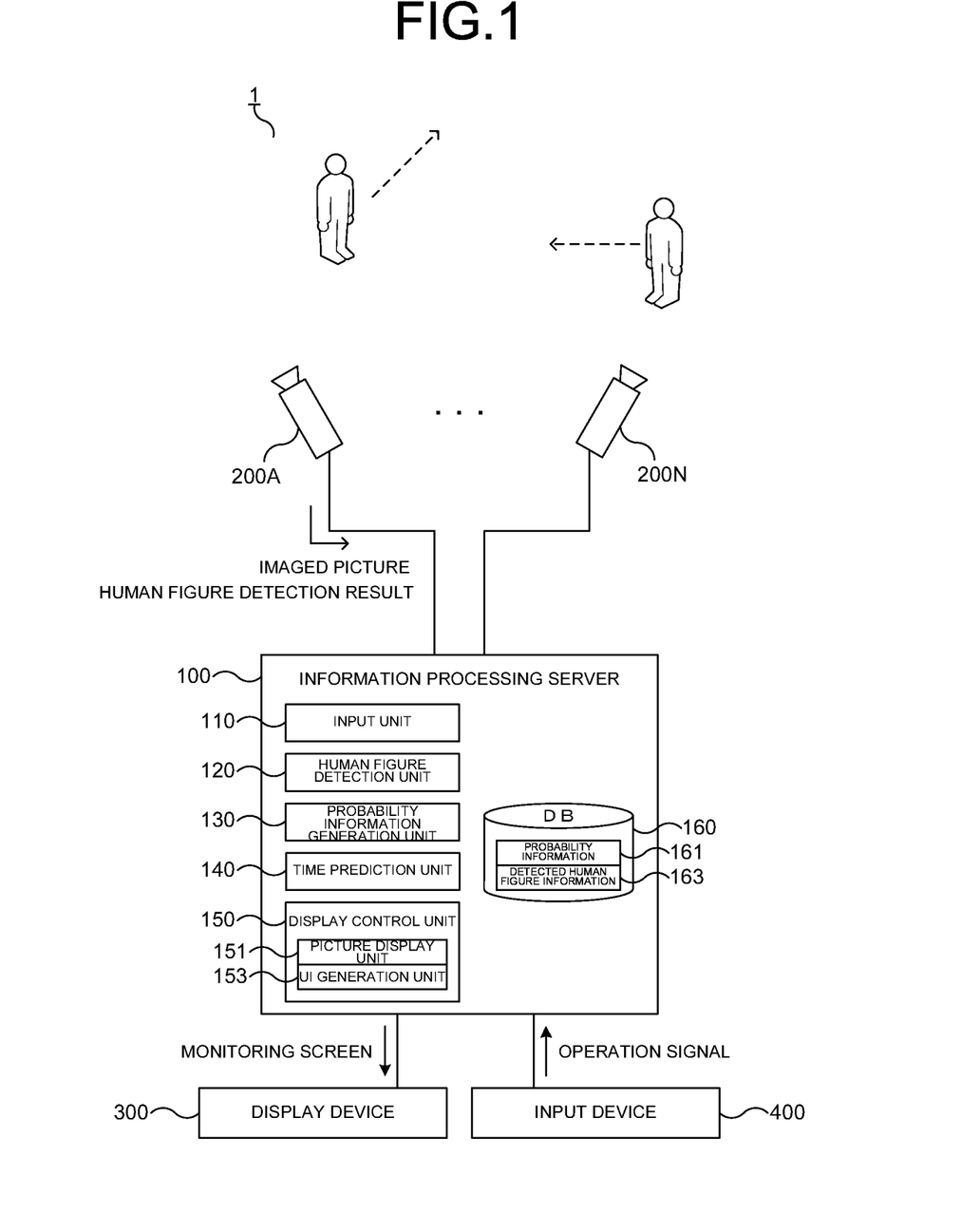
FIG. 1 is a functional block diagram showing a schematic configuration of the monitoring system according to the first embodiment.

The system configuration of the monitoring system 1 as the information processing system according to this embodiment is now explained with reference to FIG. 1. FIG. 1 is a block diagram showing the system configuration of the monitoring system 1.

The monitoring system 1 is generally configured from an information processing server 100, a plurality of video cameras 200 (video cameras 200A to 200N; hereinafter collectively referred to as the "video cameras 200") that capture (take) images (video images), a display device 300, and an input device 400.

In the ensuing explanation, the monitoring system 1 is explained as a system for monitoring (tracking) a human figure imaged by the video cameras 200, but the object to be monitored may also be various moving bodies such as an automobile, a bicycle, or a motorcycle.

The video cameras 200 as imaging apparatuses image pictures and determine whether there is a human figure in the imaged pictures, and send, together with the imaged pictures, information such as the position and feature quantity of the human figure to the information processing server 100. Moreover, the video cameras 200 can track the human figure in the pictures by comparing the imaged pictures between frames. Note that processing of detecting the human figure, extracting the feature quantity, and tracking the human figure in the camera may also be performed, for example, by the information processing server 100 or another information processing apparatus not shown.

The information processing server 100 performs various types of processing such as detecting the human figure, registering the human figure to be tracked, and tracking the registered human figure by analyzing the pictures imaged by the video cameras 200.

Note that, in the ensuing explanation, mainly explained will be the case of performing human figure monitoring (human figure tracking) based on real-time pictures imaged by the video camera 200, but without limitation thereto, for example, it is also possible to track (monitor) the human figure based on the pictures that were stored in a storage device (for example, HDD (Hard Disk Drive) or VCR (Video Cassette Recorder)) after being imaged by the video cameras 200. In addition, it is also possible to track the human figure by playing the moving image stored in the storage device backwards (reverse playback). Normally, when a certain human figure engages in suspicious behavior, since it is necessary to check the path and the actions that the human figure had taken before the foregoing suspicious behavior, it is extremely useful to enable this kind of tracking based on reverse playback.

Figure 2:
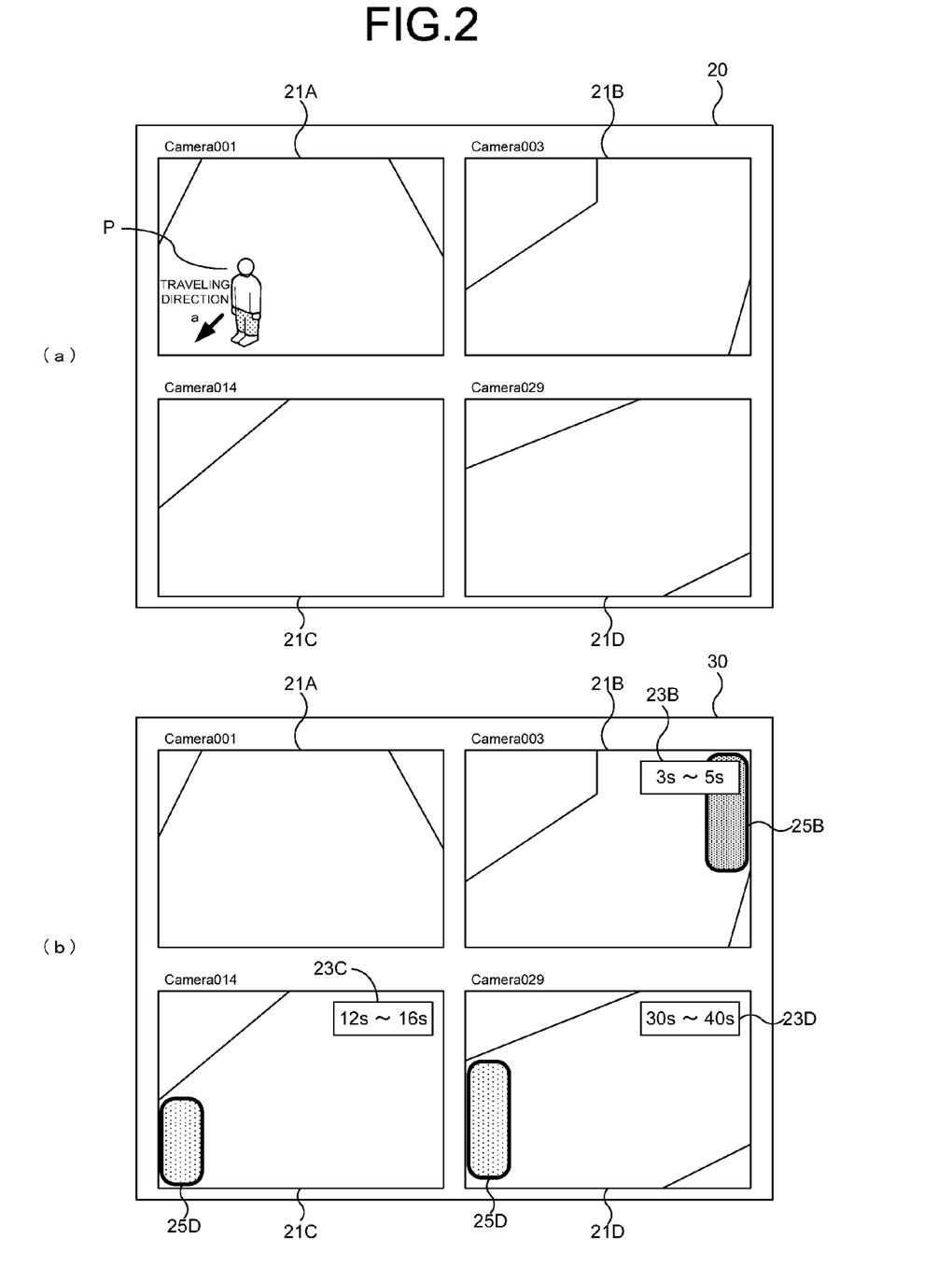
FIG. 2 is a diagram showing a specific example of the display screen.

In the human figure monitoring based on the information processing server 100, the information processing server 100 outputs a monitoring screen to the display device 300, and receives operation signals of various operation inputs pertaining to the human figure monitoring (human figure tracking) from the input device 400. More specifically, for example, by displaying a plurality of pictures input from the video cameras 200 on the monitoring screen displayed on the display device 300 (specific example is shown in FIG. 2 described later), the user as the monitor can comprehend the current location of the human figure to be monitored and, if the human figure is not displayed in any of the pictures, in which video camera 200 the human figure is likely to subsequently appear. Thus, the information processing server 100 includes a function (next camera prediction) of predicting in which video camera 200 the human figure will appear.

In addition, upon showing a user (notifying a user of) a video camera 200 in which the human figure to be monitored is likely to subsequently appear, the information processing server 100 can dynamically indicate when the human figure is likely to appear. For example, when it is likely that the human figure will appear in the next 3 seconds to 5 seconds, a message to such effect is displayed on the display screen so that the user as the monitor can recognize the time period that he/she should carefully observe the display screen. In addition, since the likelihood of the video camera 200 in which the human figure to be monitored will subsequently appear will change according to the elapsed time after the human figure frames out from the picture of the video camera 200, the information processing server 100 dynamically calculates the probability that the human figure will appear in the respective video cameras 200, and subsequently displays a message to the user according to the calculated probability. Details of this processing will be described later with reference to FIG. 2 to FIG. 4.

The user as the monitor can view the display device 300 and, when the human figure to be monitored appearing in the picture (moving image) of a certain video camera 200 appears in a picture of another video camera 200 after framing out from the foregoing video camera 200, operate the input device 400 and associate the two human figures as the same human figure. Otherwise, the information processing server 100 may also associate the human figures, without manual operation, based on information such as the feature quantity of the imaged human figure.

The display device 300 is a display for displaying images, for example, on a liquid crystal or an organic EL (Electro Luminescence). The display device 300 displays the monitoring screen that is output from the information processing server 100.

The input device 400 is a device to be used by the user (monitor) for inputting various types of information. For example, a pointing device such as a mouse, a touch pad or a touch panel, or a keyboard or the like corresponds to the input device 400. The various types of processing for registering the human figure to be monitored (human figure to be tracked), and associating the registered human figure and the human figure that newly appeared in the video camera 200 (association as the same human figure) are performed based on the user's operations input using the input device 400.

Note that various configurations may be considered for the information processing server 100, and the display device 300 and the input device 400. For example, the display device 300 and the input device 400 may be realized as one client, or, otherwise, the functions of the information processing server 100, the display device 300, and the input device 400 may be realized using four or more information processing apparatuses. Moreover, when the display device 300 and the input device 400 are realized as one client, a part of the functions of the information processing server 100 of this embodiment may be performed by the client.

(1.1.2 Configuration of Information Processing Server 100)

The configuration of the information processing server 100 according to this embodiment is now explained. The information processing server 100 includes, as shown in FIG. 1, an input unit 110, a human figure detection unit 120, a probability information generation unit 130, a time prediction unit 140, a display control unit 150, and a database (DB) 160. Note that the functions of the information processing server 100 may also be realized with a plurality of information processing apparatuses (computers).

The input unit 110 outputs the pictures received from the video cameras 200 to the display control unit 150 and thereby displays the pictures on the display device 300, and registers, in the DB 160, information of the human figure detection result similarly received from the video cameras 200 as the detected human figure information 163 or the like. The detected human figure information 163 that is registered in the DB 160 by the input unit 110 includes information of the feature quantity of the human figure detected by the video cameras 200.

The human figure detection unit 120 detects that the human figure to be monitored is appearing in and has disappeared (framed out) from the picture of the video cameras 200 based on the human figure detection result that the input unit 110 received from the video camera 200. Note that, as described above, while the video cameras 200 perform human figure detection in this embodiment, without limitation thereto, the human figure detection unit 120 may also independently perform the human figure detection.

The probability information generation unit 130 calculates information pertaining to the time transition of the probability that the human figure, which framed out after appearing in a certain video camera 200, will appear in each of the other video cameras 200 (including the self-video camera 200 by giving consideration to a case of the human figure returning (making a U-turn)), and thereafter registers the information as the probability information 161 of the DB 160. The registration of the probability information 161 may be performed in advance as pre-processing, or dynamically updated while sequentially performing human figure detection. The time transition of the probability, which is generated by the probability information generation unit 130, of the human figure framing out from the picture of a certain video camera 200 thereafter appearing in another video camera 200 will be described later with reference to FIG. 3 and FIG. 4.

The time prediction unit 140 predicts the time (time period) that the human figure appearing in a certain video camera 200 will appear in another camera after framing out based on the lapse of time from the frame out and the probability information 161. This processing will be described later with reference to FIG. 3. The display control unit 150 displays various display screens such as the monitoring screen on the display device 300. The display control unit 150 includes a picture display unit 151 and a UI generation unit 153.

The picture display unit 151 displays, on the display device 300, the imaged pictures input from the input unit 110. In the example of FIG. 2 described later, a picture area to be displayed by the picture display unit 151 is provided to a part of the monitoring screen. Note that the picture that the picture display unit 151 displays on the display device 300 does not need to be a real-time picture. When a recorded picture is to be displayed on the display device 300, the pictures input from the video cameras 200 are once stored in a storage medium not shown, and the picture display unit 151 thereafter reads the pictures and displays the pictures on the display device 300.

The UI generation unit 153 displays, on the display device 300, various display screens such as the monitoring screen in which a specific example thereof is shown in FIG. 2 described later. The registration of the human figure to be monitored and the association of whether the human figures are the same human figure are performed with the GUI (Graphical User Interface) that is generated and provided by the UI generation unit 153. Moreover, in this embodiment, the UI generation unit 153 notifies the user of the video camera 200 in which the human figure to be monitored is assumed to appear and information regarding the time period thereof based on the result of the next camera prediction performed by the probability information generation unit 130 and the time prediction unit 140. The DB 160 is created, for example, in various storage devices such as an HDD not shown. The DB 160 manages the probability information 161, and the detected human figure information 163.

1.2 Outline of Operation

The functions and operations of the monitoring system 1 are now explained with reference to FIG. 2 to FIG. 4.

(1.2.1 Outline of Human Figure Monitoring)

Foremost, a specific example of the display screen displayed on the display device 300 is explained with reference to FIG. 3. FIG. 3 is a diagram showing a specific example of the display screen (hereinafter referred to as the "monitoring screen 20") that is displayed by the display device 300 for human figure monitoring.

In the example of the monitoring screen 20 illustrated in FIG. 2, included are picture areas 21A to 21D (hereinafter collectively referred to as the "picture areas 21") which respectively display the imaged pictures input from a plurality of video cameras 200.

The picture areas 21 display multi camera pictures input from a plurality of video cameras 200 as described above. Here, the pictures of the video cameras 200 displayed in the respective picture areas 21 switch continually (dynamically). For example, when the human figure to be monitored leaves the display area and the human figure subsequently reappears pursuant to the movement of that human figure, the UI generation unit 153 and the picture display unit 151 switch the pictures to be displayed in the picture areas 21 to the pictures of the video cameras 200 predicted by the time prediction unit 140.

FIG. 2(a) is a diagram showing a specific example of the monitoring screen 20 when the human figure P moving in the traveling direction a is appearing in the picture of the picture area 21A (picture of the video camera 200 having the identifier of "Camera 001"), and FIG. 2(b) is a diagram showing a specific example of the monitoring screen 20 when the human figure P is not detected by any one of the plurality of video cameras 200 after the human figure P frames out from the picture of the picture area 21A.

As evident from the specific example of FIG. 2(b), time period display areas 23B to 23D (hereinafter collectively referred to as the "time period display areas 23") and appearance position suggestive images 25B to 25D (hereinafter collectively referred to as the "appearance position suggestive images 25") are displayed in the picture areas 21B to 21D of the monitoring screen 20 after the human figure P frames out therefrom.

The time period display areas 23 show the time period in which the human figure P is likely to appear in the respective pictures. For example, since "3 s to 5 s" is displayed in the time period display area 23 of the picture area 21B, if the human figure P were to reappear, this shows that the human figure P is likely to appear in the picture area 21B within a time period of 3 seconds to 5 seconds from the current time that is displaying the monitoring screen 20. Similarly, since "12 s to 16 s" is displayed in the time period display area 23C of the picture area 21C, if the human figure P were to appear in the picture of the picture area 21C, this shows that it is likely that the human figure P will appear within a time period of 12 to 16 seconds from the current time. Since "30 s to 40 s" is displayed in the time period display area 23D of the picture area 21D, if the human figure P were to appear in the picture of the picture area 21D, this shows that it is likely that the human figure P will appear within a time period of 30 to 40 seconds from the current time.

The appearance position suggestive images 25 show the position of the picture where the human figure to be monitored P is likely to appear. Here, the appearance position suggestive image 25B is displayed in a color that is darker than the appearance position suggestive images 25C and 25D. This shows that the probability that the human figure P will appear in the picture of the picture area 21B is higher than the probability that the human figure P will appear in the picture areas 21C and 21D as of the current time. As a result of sequentially changing the color or flashing the appearance position suggestive images 25 according to the appearance probability as of the current time, it is possible to cause the user to recognize the level of possibility that the human figure P will appear and the time period in which the possibility that the human figure P will appear is high.

As a result of arranging the picture areas 21B, 21C and 21D consecutively, starting from the picture in which a possibility of the human figure P appearing next is highest, it will be easier for the user to know which picture area 21 he/she should observe more closely. Moreover, as a result of the time period display area 23 causing the user to recognize the time period in which the probability that the human figure P will appear is high, the user only needs to confirm the respective picture areas 21 during that time period; that is, there is no need for the user to closely observe the picture from a time that is earlier than the time period (range), and, since the user will no longer need to observe the pictures after the elapse of that time period, the user's monitoring load can be alleviated.

Meanwhile, there is also a possibility that the user may become confused if the display order is continually switched. Thus, the priority of the picture to be closely observed by the user as the monitor may be expressed by changing the emphasizing method based on the colors of the respective picture areas 21 or the like according to the level of possibility that the human figure P will appear, without changing the position of the pictures displayed in the respective picture areas 21.

Note that, in this embodiment, the time period in which the human figure P is likely to appear is notified based on the time period display areas 23 and the appearance position suggestive images 25, but the configuration is not limited thereto. For example, the picture areas 21 and their periphery may be flashed or the brightness thereof may be changed according to the level of possibility (probability) that the human figure P will appear.

(1.2.2 Change of User Notification According to Time Passage)

Next, change of user notification according to the time passage is explained with reference to FIG. 3. FIG. 3(a) shows a state at time T after the human figure P illustrated in FIG. 2 has framed out from the picture area 21A, and FIG. 3(b) shows a state that is 2 seconds after FIG. 3(a). Moreover, the left side of both FIGS. 3(a) and (b) shows a display example of the picture area 21, and the right side shows the time transition of the probability that the human figure P will appear in the picture area 21.

At time T, as shown in FIG. 3(a), in the time transition of the probability of possibility that the human figure P will appear, the time period having a probability that exceeds a threshold X is 3 to 5 seconds from the current time. Thus, the UI generation unit 153 displays "3 s to 5 s" in the time period display area 23 of the picture area 21.

Meanwhile, 2 seconds after time T (FIG. 3(b)), in the time transition of the probability of possibility that the human figure P will appear, the time period having a probability that exceeds a threshold X is 1 to 3 seconds from the current time. Thus, the UI generation unit 153 displays "1 to 3 s" in the time period display area 23 of the picture area 21. Accordingly, the method of providing a notice regarding the time period that the human figure P will appear in the picture area 21 changes dynamically according to the time passage.

Figure 3:
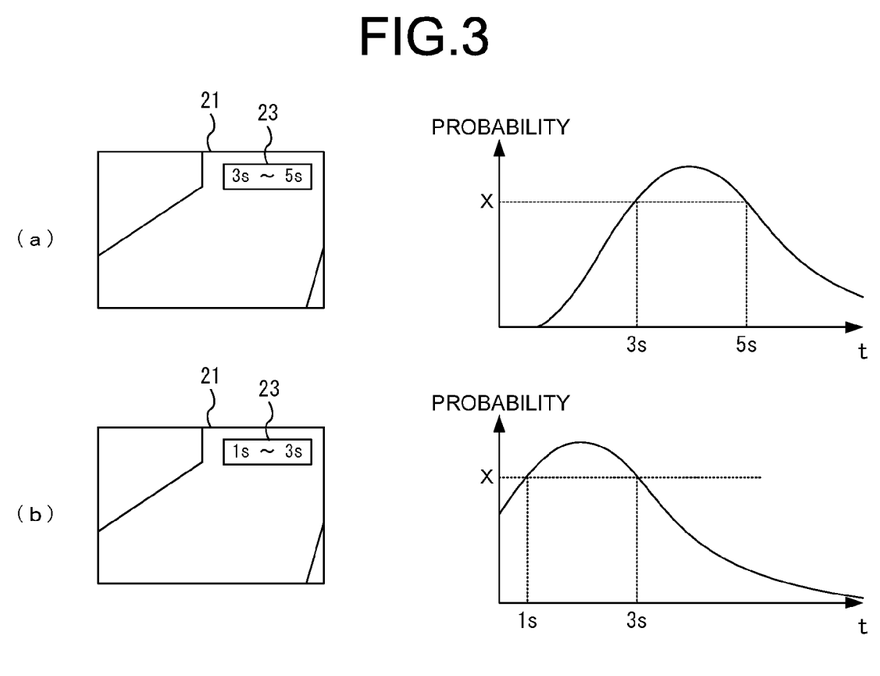
FIG. 3 is a diagram explaining the time transition of the display screen.

Note that, while not illustrated in the screen example on the left side of FIG. 3, the appearance position suggestive images 25 may be similarly changed dynamically according to the time passage as with the time period display area 23.

(1.2.3 Calculation Method of Probability of Appearance of Human Figure to be Monitored)

The calculation method of probability is now explained with reference to FIG. 4. The probability f(t|A, B) that a human figure will appear in a picture of the next video camera 200 (hereinafter referred to as the "camera B" in this section) t seconds after framing out from a picture of a certain video camera 200 (hereinafter referred to as the "camera A" in this section) can be represented with the following mathematical formula.

[Math 1]
$$f(t|A, B) = \frac{a\left(\frac{t}{\mu}\right)}{\mu}$$

Here, μ is the average appearance time that the human figure to be tracked will appear in the camera B from the camera A. Note that the average appearance time may also be corrected according to the moving speed of the human figure to be monitored in the picture of the camera A. For example, when the human figure to be monitored is moving at a speed that is twice as fast as the average speed in the picture of camera A, the average appearance time may be corrected to be half. Otherwise, attributes such as the gender and height of the human figure to be monitored may be identified in advance, and the average appearance time corresponding to those attributes may be adopted.

Figure 4:
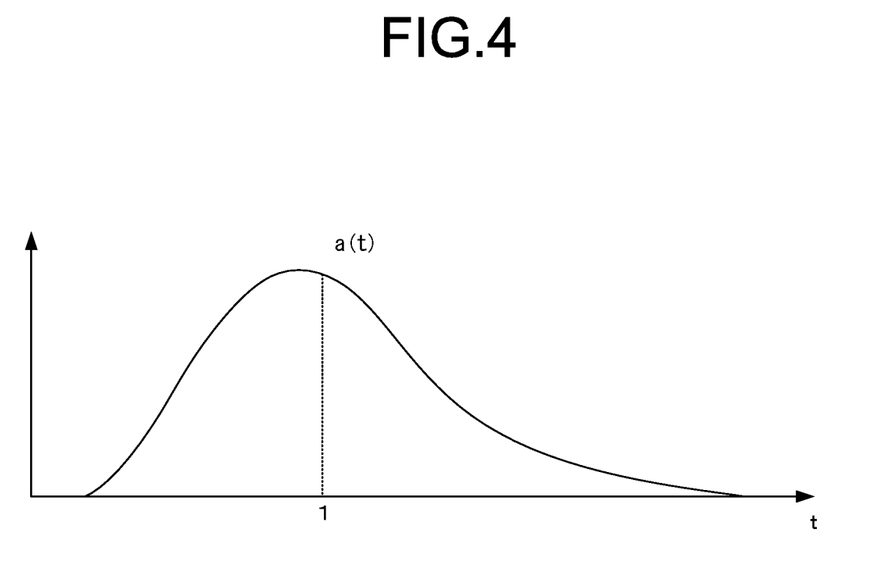
FIG. 4 is a diagram explaining a specific example of the calculation method of the probability.

Moreover, a(t) is a histogram, and a specific example thereof is shown in FIG. 4. The distribution of a(t) may also be created/updated statistically by the probability information generation unit 130 as a part of the probability information 161 based on the movement of the human figure to be monitored by the monitoring system 1, or otherwise be prepared in advance by the probability information generation unit 130 as a part of the probability information 161. Note that information regarding a(t) is generated for each pair of cameras in which the human figure can move. Otherwise, a common function may be adopted. More specifically, for example, the BPT (Brownian Passage Time) distribution expressed with the following formula may be adopted.

$$\sqrt{\frac{\mu}{2\pi\alpha^2 t^3}} \exp\left(-\frac{(t-\mu)^2}{2\mu\alpha^2 t}\right)$$ [Math 2]

Here, α is a predetermined parameter and represents the level of variation of the appearance time. While this mathematical formula is a mathematical formula in the case of hypothesizing that the movement of the human figure is based on a Brownian motion, it is also possible to adopt another heuristic function such as by expressing the BPT distribution with a piecewise linear function.

Furthermore, consideration may be given to cases where A and B are the same (that is, when the human figure to be monitored makes a U-turn). Note that, as evident from the foregoing mathematical formula and FIG. 4, the probability that the human figure to be tracked will appear in the camera B from the camera A is highest near the average appearance time μ.

The foregoing mathematical formula expressing the probability f may also be rewritten as follows. When the time that the human figure to be tracked disappeared (framed out) from the camera A is T extinction and the current time is T, the probability p(T|A, B) that the human figure will appear in the camera B at time T can be expressed with the following formula.

$$p(T|A,B)=f(T-T_{extinction}|A,B)$$ [Math 3]

Note that it is also possible to determine that the human figure to be tracked left from the exit when a given period of time or longer has elapsed after framing out from the camera A (when t exceeds the threshold), or when the probability becomes smaller than the predetermined threshold. Otherwise, a p(T|A, exit) may be provided and the human figure leaving from the exit may be dealt with separately. Moreover, on the assumption that the total number of cameras is N-number of cameras, when all cameras are Ci (i=1, 2, . . . N), the value calculated with the following mathematical formula may also be used by considering that the probability that the human figure to be monitored will appear in the picture of the camera B at time T is more likely than not appearing in a camera other than the camera B.

$$\frac{p(T|A,B)}{\sum_{i=1}^{N} p(T|A,C_i)}$$ [Math 4]

According to the foregoing calculation, when the possibility that the human figure will appear in a video camera other than the camera B is 0, the value will be close to 1, and when the possibility of the human figure appearing in a video camera other than the camera B is high, the value will be close to 0.

Moreover, while consideration is not given in the foregoing mathematical formula, the probability calculation may give consideration to whether the human figure has appeared based on the feature quantity and the like of the human figure that appeared in the camera B or other video cameras 200. For example, when the probability that human figure that appeared in the camera B is the human figure to be monitored is g based on the feature quantity of that human figure, the probability can be calculated based on the following mathematical formula.

$$p(T|A,B)=f(T-T_{extinction}|A,B)\times g$$ [Math 5]

In this mathematical formula, g does not exist when a human figure does not appear in the camera B, and the probability cannot be calculated. Thus, when a human figure does not appear in the camera B, the calculation may be performed with the following mathematical formula by using a predetermined constant c.

$$p(T|A,B)=f(T-T_{extinction}|A,B)\times c$$ [Math 6]

1.3 Flow of Processing

Figure 5:
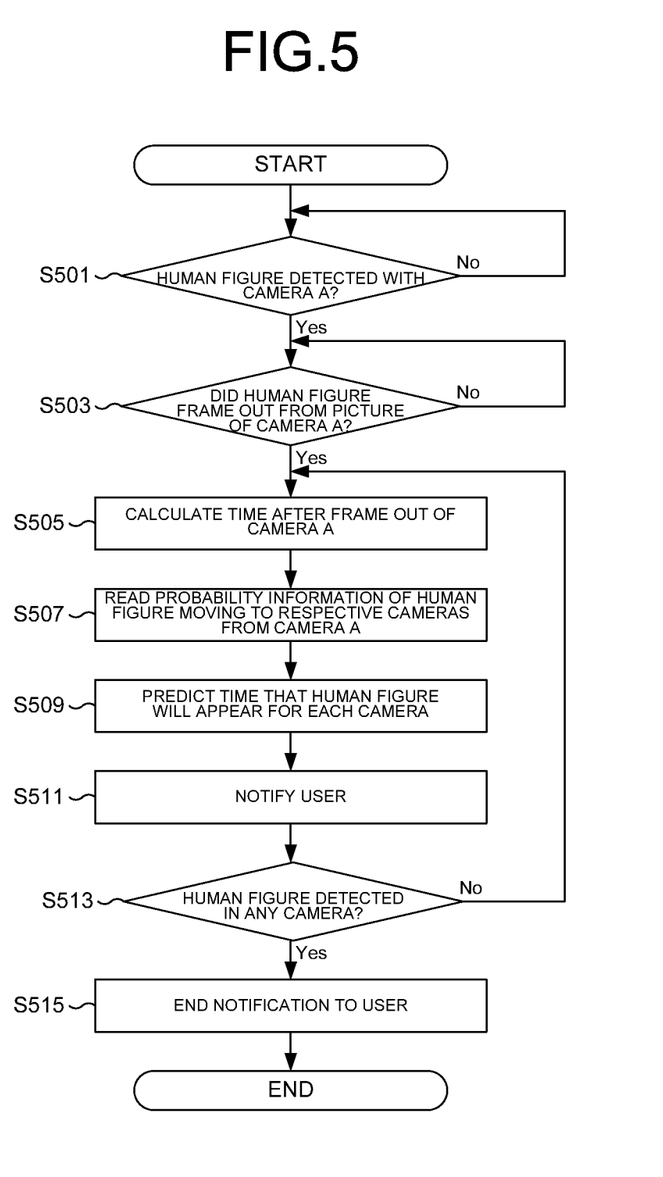
FIG. 5 is a flowchart showing the flow of processing of the information processing server illustrated in FIG. 1.

Next, the processing flow of the information processing server 100 is explained with reference to FIG. 5. FIG. 5 is a flowchart showing the processing flow of the information processing server 100 according to this embodiment.

Note that the respective processing steps described later may be executed by arbitrarily changing the order or in parallel to the extent that it is not inconsistent with the processing contents. Moreover, another step may be added between the respective processing steps. In addition, a step that is described as one step as a matter of convenience may also be executed by being split into a plurality of steps, and steps that are described by being split into a plurality of steps as a matter of convenience may also be executed as one step.

Foremost, the human figure detection unit 120 determines whether a human figure is appearing as an object to be detected in a picture imaged by the video camera 200 based on information from the video camera 200 which was received by the input unit 110 (S501). This video camera 200 is hereafter referred to as the "camera A".

As a result of the determination in S501, when a human figure is detected in the picture imaged by the camera A (S501: Yes), the human figure detection unit 120 determines whether that human figure subsequently framed out from the camera A (S503).

When the human figure has framed out from the camera A (S503: Yes), the time prediction unit 140 foremost calculates the elapsed time after the human figure framed out from the camera A (S505). By additionally referring to the probability information 161 from the DB 160 (S507), the time prediction unit 140 generates a time transition (for example, information corresponding to the graph on the right side of FIG. 3) of the probability that the human figure will appear in the picture of the respective video cameras 200 relative to the respective video cameras 200 at a position to where the human figure can move from the camera A.

Subsequently, the time prediction unit 140 obtains the time period in which the human figure is likely to appear in the respective video cameras 200 for each video camera 200 to where the human figure that framed out from the camera A can move (S509). More specifically, for example, in the time transition of the probability shown on the right side of FIG. 3, the time prediction unit 140 can specify the time period in which the probability exceeds the threshold X as the time period in which that human figure is likely to appear in that video camera 200.

The UI generation unit 153 rearranges the pictures in the picture areas 21 of the monitoring screen 200 consecutively, starting from the picture at the earliest time period in which the human figure is likely to move from the camera A to the respective video cameras 200 as predicted by the time prediction unit 140, and subsequently indicates that time period in the time period display area 23 (S511). Note that, as described above, the method of providing a notice regarding the time period to the user is not limited thereto.

Subsequently, the human figure detection unit 120 determines whether the human figure to be tracked that framed out from the camera A was detected by any one of the video cameras 200 (S513). If not detected (S513: Yes), the information processing server 100 repeats the processing of S505 onward. Meanwhile, if the human figure to be tracked has been detected by any one of the video cameras 200 (S513: Yes), notification to the user is ended (S515).

1.4 Hardware Configuration

An example of the hardware configuration in the case of realizing the foregoing information processing server 100 with a computer is now explained with reference to FIG. 6. Note that, as described above, the functions of the information processing server 100 may also be realized with a plurality of information processing apparatuses.

Figure 6:
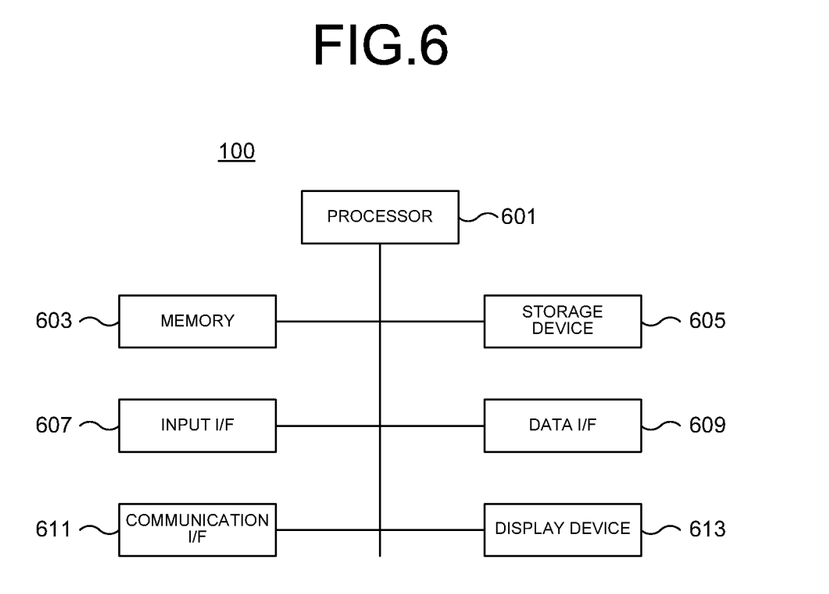
FIG. 6 is a block diagram showing a configuration of the hardware capable of mounting the information processing server illustrated in FIG. 1.

As shown in FIG. 6, the information processing server 100 includes a processor 601, a memory 603, a storage device 605, an input interface (I/F) 607, a data I/F 609, a communication I/F 611, and a display device 613.

The processor 601 controls the various types of processing in the information processing server 100 by executing the programs stored in the memory 603. For example, the processing pertaining to the input unit 110, the human figure detection unit 120, the probability information generation unit 130, the time prediction unit 140 and the display control unit 150 explained with reference to FIG. 1 may be realized as programs that are once stored in the memory 603 and subsequently run on the processor 601.

The memory 603 is, for example, a storage medium such as a RAM (Random Access Memory). The memory 603 temporarily stores program codes of programs to be executed by the processor 601 and data that is required upon executing the programs. For example, a stack area that is required upon executing the programs is secured in the storage area of the memory 603.

The storage device 605 is, for example, a hard disk or a nonvolatile storage medium such as a flash memory. The storage device 605 stores an operating system, various programs for realizing the input unit 110, the human figure detection unit 120, the probability information generation unit 130, the time prediction unit 140 and the display control unit 150, and various data including the probability information 161 and the detected human figure information 163 that are stored as the DB 160. The programs and data stored in the storage device 605 are referred to by the processor 601 by being loaded into the memory 603 as needed.

The input I/F 607 is a device for receiving inputs from the user. The input device 400 explained with reference to FIG. 1 can also be realized with the input I/F 607. As a specific example of the input I/F 607, considered may be a keyboard, a mouse, a touch panel, or various sensors. The input I/F 607 may also be connected to the information processing server 100 via an interface such as a USB (Universal Serial Bus).

The data I/F 609 is a device for inputting data from the outside of the information processing server 100. As a specific example of the data I/F 609, there is a drive device for reading the data stored in the various storage mediums. The data I/F 609 may also be provided outside the information processing server 100. In the foregoing case, the data I/F 609 is connected to the information processing server 100 via an interface such as a USB.

The communication I/F 611 is a device for communicating data via wired or wireless communication with a device; for instance, the video camera 200 or the like, that is outside the information processing server 100. The communication I/F 611 may also be provided outside the information processing server 100. In the foregoing case, the communication I/F 611 is connected to the information processing server 100 via an interface such as a USB.

The display device 613 is a device for displaying various types of information. The display device 300 explained with reference to FIG. 1 may also be realized with the display device 613. As a specific example of the display device 613, considered may be, for example, a liquid crystal display or an organic EL (Electro-Luminescence) display. The display device 613 may also be provided outside the information processing server 100. In the foregoing case, the display device 613 is connected to the information processing server 100 via a display cable or the like.

1.5 Effect of this Embodiment

As described above, with the monitoring system 1 according to this embodiment, the time period (time interval) that the human figure to be tracked is likely to move from a certain video camera 200 to the imaging area of each of the video cameras 200 is notified to the user. Since the user as the monitor can thereby clearly comprehend the time period that he/she needs to closely observe the respective pictures, the load of human figure monitoring can be alleviated.

2 Second Embodiment

Figure 7:
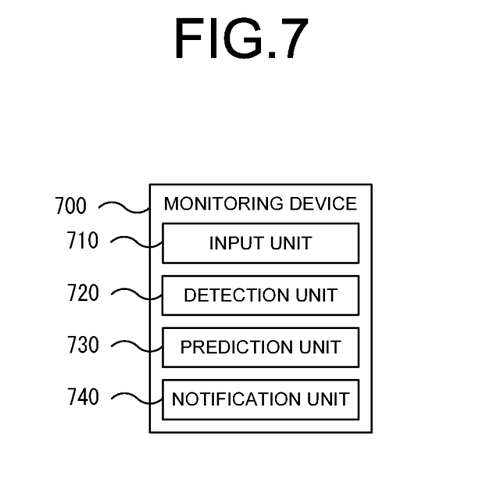
FIG. 7 is a functional block diagram showing a schematic configuration of the monitoring device according to the second embodiment.

The second embodiment is now explained with reference to FIG. 7. FIG. 7 is a block diagram showing the functional configuration of a monitoring device 700 as an information processing system. As shown in FIG. 7, the monitoring device 700 includes an input unit 710, a detection unit 720, a prediction unit 730, and a notification unit 740. The input unit 710 can receive inputs of pictures imaged by video cameras (imaging devices) not shown.

The detection unit 720 detects a moving body appearing in a picture which was input from the input unit 710 and imaged by at least one video camera among a plurality of video cameras. Here, as specific examples of a moving body, in addition to a human being, considered may be an automobile, a bicycle, or a motorcycle.

The prediction unit 730 predicts a time period in which a moving body will appear in another video camera based on a time transition of a probability of the moving body detected with a certain video camera appearing in a picture of another video camera including the foregoing video camera and a time passage after the moving body leaves an imaging range of the picture of the video camera. The notification unit 740 notifies the time period in which the moving body is predicted to appear in the picture of the other video camera. As a result of adopting the foregoing configuration, according to the monitoring device 700 of this embodiment, the moving body imaged by a plurality of imaging apparatuses can be suitably monitored.

3 Supplementary Information

Note that the configuration of the foregoing embodiments may be combined or partially replaced. Moreover, the configuration of the present invention is not limited to the foregoing embodiments, and may be variously modified to the extent that the modification does not deviate from the gist of the present invention.

Note that a part or the hole of each of the foregoing embodiments may also be described as per, but are not limited to, the following notes. Moreover, the program of the present invention will suffice so as long as it is a program that causes a computer to execute the respective operations explained in each of the foregoing embodiments.

(Supplementary Note 1)

An information processing system, comprising: input means for receiving inputs of pictures imaged by a plurality of imaging apparatuses; detection means for detecting a moving body appearing in a picture input from the input means and imaged by a first imaging apparatus among the plurality of imaging apparatuses; prediction means for predicting a time period in which the moving body appears in a picture imaged by a second imaging apparatus among the plurality of imaging apparatuses, based on a time transition of a probability of the moving body, which is detected in the picture of the first imaging apparatus, appearing in the picture of the second imaging apparatus and a time passage after the moving body detected in the picture of the first imaging apparatus leaves an imaging range; and notification means for providing a notice regarding a time period in which the moving body is predicted to appear in the picture of the second imaging apparatus.

(Supplementary Note 2)

The information processing system according to supplementary note 1, wherein the prediction means predicts, as the time period in which the moving body appears in the picture of the second imaging apparatus, a time period in which the probability that the moving body detected in the picture of the first imaging apparatus appears in the picture imaged by the second imaging apparatus exceeds a threshold.

(Supplementary Note 3)

The information processing system according to supplementary note 1 or 2, wherein the notification means provides a notice regarding the time period by displaying a time period in which the moving body is predicted to appear in the picture imaged by the second imaging apparatus.

(Supplementary Note 4)

The information processing system according to Supplementary note 1 or 2, wherein the notification means provides a notice regarding the time period by changing a display of the picture imaged by the second imaging apparatus in the time period in which the moving body is predicted to appear.

(Supplementary Note 5)

An information processing method performed by an information processing system, comprising: a step receiving inputs of pictures imaged by a plurality of imaging apparatuses; a step of detecting a moving body appearing in a picture imaged by a first imaging apparatus among the plurality of imaging apparatuses; a step of predicting a time period in which the moving body appears in a picture imaged by a second imaging apparatus among the plurality of imaging apparatuses, based on a time transition of a probability of the moving body, which is detected in the picture of the first imaging apparatus, appearing in the picture of the second imaging apparatus and a time passage after the moving body detected in the picture of the first imaging apparatus leaves an imaging range; and a step of providing a notice regarding a time period in which the moving body is predicted to appear in the picture of the second imaging apparatus.

(Supplementary Note 6)

The information processing method according to Supplementary note 5, wherein, as the time period, in which the moving body appears in the picture of the second imaging apparatus, predicted is a time period in which the probability that the moving body detected in the picture of the first imaging apparatus appears in the picture imaged by the second imaging apparatus exceeds a threshold.

(Supplementary Note 7)

The information processing method according to Supplementary note 5 or 6, wherein the time period is notified by displaying a time period in which the moving body is predicted to appear in the picture imaged by the second imaging apparatus.

(Supplementary Note 8)

The information processing method according to Supplementary note 5 or 6, wherein the time period is notified by changing a display of the picture imaged by the second imaging apparatus during the time period in which the moving body is predicted to appear in the picture of the second imaging apparatus.

(Supplementary Note 9)

A program for causing a computer to execute: processing of receiving inputs of pictures imaged by a plurality of imaging apparatuses; processing of detecting a moving body appearing in a picture imaged by a first imaging apparatus among the plurality of imaging apparatuses; processing of predicting a time period in which the moving body appears in a picture imaged by a second imaging apparatus among the plurality of imaging apparatuses based on a time transition of a probability of the moving body, which is detected in the picture of the first imaging apparatus, appearing in the picture of the second imaging apparatus and a time passage after the moving body detected in the picture of the first imaging apparatus leaves an imaging range; and processing of providing a notice regarding a time period in which the moving body is predicted to appear in the picture of the second imaging apparatus.

(Supplementary Note 10)

The program according to supplementary note 9, wherein, as the time period, in which the moving body appears in the picture of the second imaging apparatus, predicted is a time period in which the probability that the moving body detected in the picture of the first imaging apparatus appears in the picture imaged by the second imaging apparatus exceeds a threshold.

(Supplementary Note 11)

The program according to supplementary note 9 or 10, wherein the time period is notified by displaying a time period in which the moving body is predicted to appear in the picture imaged by the second imaging apparatus.

(Supplementary Note 12)

The program according to supplementary note 9 or 10, wherein the time period is notified by changing a display of the picture imaged by the second imaging apparatus during the time period in which the moving body is predicted to appear in the picture of the second imaging apparatus.

This application relates to and claims priority from Japanese Patent Application No. 2012-237987, filed on Oct. 29, 2012, the entire disclosure of which is incorporated herein by reference.

1 . . . monitoring system, 20 . . . monitoring screen, 21 . . . picture area, 23 . . . time period display area, 25 . . . appearance position suggestive image, 100 . . . information processing server, 110 . . . input unit, 120 . . . human figure detection unit, 130 . . . probability information generation unit, 140 . . . time prediction unit, 150 . . . display control unit, 151 . . . picture display unit, 153 . . . UI generation unit, 160 . . . database (DB), 161 . . . probability information, 163 . . . detected human figure information, 200 . . . video camera, 300 . . . display device, 400 . . . input device, 601 . . . processor, 603 . . . memory, 605 . . . storage device, 607 . . . input interface (I/F), 609 . . . data interface, 611 . . . communication interface, 613 . . . display device, 700 . . . monitoring device, 710 . . . input unit, 720 . . . detection unit, 730 . . . prediction unit, 740 . . . notification unit

I claim:

1. An information processing system, comprising:
   a memory storing instructions; and
   one or more processors configured to execute the instructions to:
   receive inputs of pictures imaged by a plurality of imaging apparatuses;
   detect a moving body appearing in an inputted picture imaged by a first imaging apparatus among the plurality of imaging apparatuses;
   predict a time period in which the moving body will appear in a picture imaged by a second imaging apparatus among the plurality of imaging apparatuses, based on a calculated function of probability that the moving body will appear in the picture imaged by the second imaging apparatus and an elapsed time after the moving body leaves an imaging range;
   determine a probability that the moving body appears in the picture imaged by the second imaging apparatus based on the calculated function of probability and the elapsed time; and
   notify the predicted time period in which the moving body is predicted to appear in the picture imaged by the second imaging apparatus.

2. The information processing system of claim 1, wherein the one or more processors are further configured to execute the instructions to predict a time period in which the probability that the moving body detected in the inputted picture imaged by the first imaging apparatus appears in the picture imaged by the second imaging apparatus exceeds a threshold.

3. The information processing system of claim 1, wherein the one or more processors are further configured to execute the instructions to notify the time period by displaying a time period in which the moving body is predicted to appear in the picture imaged by the second imaging apparatus.

4. The information processing system of claim 1, wherein the one or more processors are further configured to execute the instructions to notify the time period by changing a display of the picture imaged by the second imaging apparatus in the time period in which the moving body is predicted to appear.

5. An information processing method performed by an information processing system, the method comprising:
   receiving inputs of pictures imaged by a plurality of imaging apparatuses;
   detecting a moving body appearing in a picture imaged by a first imaging apparatus among the plurality of imaging apparatuses;
   predicting a time period in which the moving body appears in a picture imaged by a second imaging apparatus among the plurality of imaging apparatuses, based on a calculated function of probability that the moving body will appear in the picture imaged by the second imaging apparatus and an elapsed time after the moving body leaves an imaging range;
   determining a probability that the moving body appears in the picture imaged by the second imaging apparatus based on the calculated function of probability and the elapsed time; and
   notifying the predicted time period in which the moving body is predicted to appear in the picture imaged by the second imaging apparatus.

6. A non-transitory computer-readable medium including a memory storing a program that, when executed by a processor, cause the processor to perform a method, the method comprising:
   receiving inputs of pictures imaged by a plurality of imaging apparatuses;
   detecting a moving body appearing in a picture imaged by a first imaging apparatus among the plurality of imaging apparatuses;
   predicting a time period in which the moving body appears in a picture imaged by a second imaging apparatus among the plurality of imaging apparatuses, based on a calculated function of probability that the moving body will appear in the picture imaged by the second imaging apparatus and an elapsed time after the moving body leaves an imaging range;
   determining a probability that the moving body appears in the picture imaged by the second imaging apparatus based on the calculated function of probability and the elapsed time; and
   notifying the predicted time period in which the moving body is predicted to appear in the picture imaged by the second imaging apparatus.

7. The information processing method of claim 5, wherein the predicting includes calculating a time period in which the probability that the moving body detected in the inputted picture imaged by the first imaging apparatus appears in the picture imaged by the second imaging apparatus exceeds a threshold.

8. The information processing method of claim 5, wherein notifying includes displaying the time period on a display device.

9. The information processing method of claim 5, wherein notifying includes changing a display of the picture imaged by the second imaging apparatus in the time period in which the moving body is predicted to appear.

10. The non-transitory computer-readable medium of claim 6, wherein the predicting includes calculating a time period in which the probability that the moving body detected in the inputted picture imaged by the first imaging apparatus appears in the picture imaged by the second imaging apparatus exceeds a threshold.

11. The non-transitory computer-readable medium of claim 6, wherein notifying includes displaying the time period on a display device.

12. The non-transitory computer-readable medium of claim 6, wherein notifying includes changing a display of the picture imaged by the second imaging apparatus in the time period in which the moving body is predicted to appear.

13. The information processing system of claim 1, wherein the one or more processors are further configured to execute the instructions to identify one of the pictures having the highest probability, and wherein the moving body appears in the picture having the highest probability after the moving body leaves the imaging range.

14. The information processing method of claim 5, further comprising identifying one of the pictures having the highest probability, wherein the moving body appears in the picture having the highest probability after the moving body leaves the imaging range.

15. The non-transitory computer-readable medium of claim 6, further comprising identifying one of the pictures having the highest probability, wherein the moving body appears in the picture having the highest probability after the moving body leaves the imaging range.

16. The information processing system of claim 1, wherein the one or more processors are further configured to rearrange pictures in a picture area of a monitoring screen according to the predicted time period.

17. The information processing method of claim 5, further comprising rearranging pictures in a picture area of a monitoring screen according to the predicted time period.

18. The non-transitory computer-readable medium of claim 6, further comprising rearranging pictures in a picture area of a monitoring screen according to the predicted time period.

19. The information processing system of claim 16, wherein the one or more processors are further configured to indicate the predicted time period in the picture area of the monitoring screen.

20. The information processing method of claim 17, further comprising indicating the predicted time period in the picture area of the monitoring screen.

* * * * *